United States Patent

Mitchell et al.

[11] Patent Number: 5,949,020
[45] Date of Patent: Sep. 7, 1999

[54] SURFACE MOUNT CABLE CLIP AND SHIELD CLIP

[75] Inventors: Jay R. Mitchell, Mesa; Matthew R. Michieli, Chandler, both of Ariz.

[73] Assignee: Motorola, Inc., Schaumburg, Ill.

[21] Appl. No.: 08/883,010

[22] Filed: Jun. 26, 1997

[51] Int. Cl.⁶ .................................................. H02G 7/00
[52] U.S. Cl. .............. 174/40 CC; 174/135; 174/138 G; 248/74.2; 439/98
[58] Field of Search ................... 248/68.1, 74.1, 248/65, 72, 74.2; 174/138 E, 135, 161 R, 159, 163 R, 40 CC, 138 G, 158 R; 439/92, 98

[56] References Cited

U.S. PATENT DOCUMENTS

| | | | |
|---|---|---|---|
| 3,228,640 | 1/1966 | Walsh | 248/72 |
| 4,903,920 | 2/1990 | Merritt | 248/71 |
| 5,124,889 | 6/1992 | Humbert et al. | 361/424 |
| 5,230,489 | 7/1993 | White et al. | 248/74.2 |
| 5,402,315 | 3/1995 | Reichle | 361/784 |
| 5,411,228 | 5/1995 | Morawa et al. | 248/74.5 |
| 5,615,852 | 4/1997 | Heidorn et al. | 248/74.5 |

*Primary Examiner*—Kristine Kincaid
*Assistant Examiner*—Dhiru R. Patel
*Attorney, Agent, or Firm*—Mark D. Patrick

[57] ABSTRACT

A clip (100) for securing a cable (202) and shield (216) to a surface (209) of a printed wiring board (208) includes a retainer (102) and a shield clip (112). The retainer includes a first side wall (104) and a second side wall (106) joined by a base (105). The side walls and base define a channel (108) sized to retain the cable. The shield clip extends from the retainer and is spaced from the retainer to retain a wall of the shield between the retainer and the shield clip. The retainer further includes a flange (110) for mounting to the surface of the printed wiring board.

7 Claims, 1 Drawing Sheet

SURFACE MOUNT CABLE CLIP AND SHIELD CLIP

CROSS REFERENCE TO RELATED APPLICATION

This application is related to application Ser. No. 08/882,770 entitled "Clip For Surface Mount Termination of a Coaxial Cable," attorney docket number GE04107, filed on even date herewith and commonly assigned to the assignee of the present application.

FIELD OF THE INVENTION

The present invention generally relates to electrical connectors. More particularly, the present invention relates to a surface mount coaxial cable clip and shield clip.

BACKGROUND OF THE INVENTION

Electrical cables are used in conjunction with a printed wiring board (PWB) to conduct electrical signals between a location on the PWB and another location in the circuit. Such electrical cables typically include a center conductor surrounded by a dielectric or insulating layer. In a coaxial cable, the cable also includes a shield layer surrounding but electrically isolated from the center conductor.

In modern electronic devices, such as portable radios, surface mount techniques are used to minimize the area required for mounting of components such as electrical cables. Components and cable terminations are soldered directly to the surface of the PWB, eliminating the space and expense required for plated-through solder holes. Also, surface mounted components may be placed automatically by a pick and place machine, reducing cost and time for manufacture and improving quality. Surface mounting increases the density of component placement on a PWB and reduces the size of the PWB.

Cables are difficult to handle, both for surface mounting and for automated pick and place. Pick and place machines require a relatively large, flat area on the outer surface of a component for engagement by a vacuum pick and place tool. Cables are typically round in cross section and are too small in diameter to be reliably picked up by the vacuum tool. Moreover, when such cables are soldered to the surface of the printed wiring board, the cables tend to roll because of the round cross section of the cable and because of soldering of the cable's center conductor to the PWB surface rather than insertion of the center conductor through a plated through hole.

The difficulty in handling such cables increases the expense associated with their use in any design. Handling and mounting such cables, rather than being automated, requires manual labor. Manual labor is more expensive, takes longer and is less reliable than automated methods. Cables and PWB assemblies which are damaged during handling and mounting of cables must be reworked or discarded.

Another component which requires special handling during assembly of a printed wiring board is a shield. A shield is a conductive element, typically box shaped, placed over a portion of circuitry on a PWB to protect the circuitry from electromagnetic radiation originating outside the shield or to protect adjacent circuits from electromagnetic energy originating inside the shield. As electronic circuitry has been miniaturized and packed ever more tightly together, more and more shields are required for electrical isolation in the finished assembly.

Shields are typically removably mounted to the surface of the printed wiring board. Removability is desired because, with a shield in place, the circuitry beneath the shield is inaccessible for test or repair. When the shield is removed, the circuitry may be tested and repaired. Following the repair, the shield is replaced for proper operation of the assembly.

To permit a shield to be removed and subsequently replaced, shields are held in place using shield clips. A shield clip is a component which mounts to the PWB and mechanically engages the shield to retain the shield in place. For the same reasons that other components are surface mounted on a PWB, including eliminating the space and expense required for plated-through solder holes and more densely packing circuitry on the PWB, shield clips are surface mounted on the PWB, too.

Accordingly, there is a need in the art for apparatus for surface mount attachment and for automated pick and place of a cable and shield in an electronic assembly.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
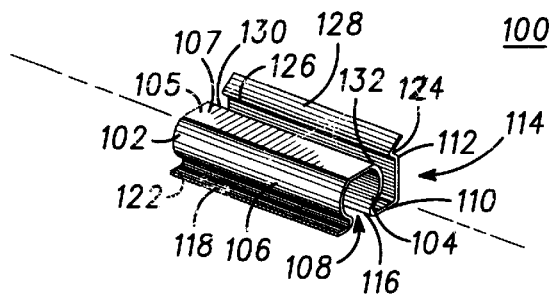
FIG. 1 is an isometric view of a first embodiment of a clip in accordance with the present invention.

Referring now to FIG. 1, a clip 100 for securing a cable and a shield to a surface of a printed wiring board includes a retainer 102 and a shield clip 112. The retainer 102 is configured for attachment to a cable and for secure retention thereof. The shield clip 112 extends from the retainer to mechanically engage a shield to retain the shield in place. The clip 100 is suitable for surface mounting to the printed wiring board and for automated pick and place assembly by, for example, a vacuum tool.

The retainer 102 includes a first side wall 104, a second side wall 106 and a base 105 joining the first side wall 104 and the second side wall 106. The base 105 has a substantially flat outer surface 107 for engagement by a pick and place tool. The flat outer surface 107 provides a surface for attachment of a surface mount tool, such as a vacuum tool, for automated pick and place of the clip 100 or a cable assembly including the clip 100. The opportunity for automated pick and place reduces the manufacturing cost and manual labor requirements for assembly of an electronic device such as a portable radio which uses the clip 100. In applications where automated pick and place will not be used, the outer surface 107 of the base 105 may be any suitable shape.

The first side wall 104 and the second side wall 106 define a channel 108 sized to retain a cable. The first side wall 104 and the second side wall 106 extending from the base 105 are generally arcuate in shape. The first side wall 104 and the second side wall 106 define the shape of the channel 108. The channel 108 may be any suitable shape but is preferably sized and shaped to conform to the outer surface of the cable to be retained by the clip 100. Cables including coaxial cables are typically substantially round in cross section, and that is the shape of the channel 108 defined by the inner surface of the first side wall 104 and the second side wall 106 illustrated in FIG. 1. The diameter of the channel 108 is chosen to be approximately the same as or slightly less than the diameter of the cable, so that the cable will be securely retained in the channel 108. The retainer 102 is preferably formed from a somewhat elastic material, such as a beryllium copper alloy, to flex for snap-fit retention of the cable.

The first side wall 104 and the second side wall 106 are turned in around an axis 120 and terminate in a first edge 116 and a second edge 118 respectively. In the illustrated embodiment, the first edge 116 and the second edge 118 are spaced a distance less than the diameter of the cable to be retained. The channel 108 thus has an open side into which the cable may be snap-fit. The narrow open side retains the cable within the channel 108. Alternatively, the channel 108 is closed on all sides or is U-shaped, lacking any turn-in in the first side wall 104 and the second side wall 106.

The clip 100 is chosen to have any suitable length along the axis 120. A shorter length allows the clip 100 to be located in smaller areas of the surface of a printed wiring board. A longer length of the clip 100 allows a stronger connection between the clip 100 and the board.

The first side wall 104 has a flange 110 for mounting to the surface of the printed wiring board. The flange 110 extends from the first side wall 104 in a direction parallel to the surface of the printed wiring board when the clip 100 is mounted on the surface of the printed wiring board. The flange 110 is suitable for soldering to the surface of the printed wiring board, which is the preferred attachment method. The flange is preferably formed by turning the distal portion of the first side wall 104 away from the axis 120 of the clip 100.

In the illustrated embodiment, the second side wall 106 includes a second flange 122 for mounting to the surface of the printed wiring board. The second flange 122 extends from the second side wall 106 in a direction parallel to the flange 110 and parallel to the surface of the printed wiring board when the clip 100 is mounted on the surface of the printed wiring board. The second flange 122 is preferably formed by turning the distal portion of the second side wall 106 away from the axis 120 of the clip 100. The second flange 122 is suitable for soldering to the surface of the printed wiring board, which is the preferred attachment method.

In the illustrated embodiment, the clip 100 includes both the flange 110 and the second flange 122 to provide the most secure attachment between the clip 100 and the surface of the printed wiring board. In other embodiments, the second flange 122 is omitted. In still other embodiments, either the flange 110 or the second flange 122 or both are formed in segments, rather than continuously along the length of the clip 100 as shown in FIG. 1. The shape of the flange may be tailored to avoid surface obstructions and contours. These other embodiments are especially well suited for applications where surface area on the printed wiring board is very limited.

The shield clip 112 is spaced from the first side wall 104 to retain a wall of a shield between the first side wall 104 and the shield clip 112. The shield clip 112 extends from the flange 110 to define a slot 114 between the first side wall 104, the flange 110 and the shield clip 112. The slot 114 is sized to received the wall of the shield. It is envisioned that a cable will be snap fit in the channel 108 and the clip 100 mounted to the surface of the printed wiring board by soldering or other processing. Subsequently, a shield will be placed on the printed wiring board including inserting one wall of the shield in the slot 114 to secure the shield to the assembly including the board, the clip 100 and the cable.

In the illustrated embodiment, a distal portion 124 of the shield clip 112 is angled toward the first side wall 104 to define a lip 126 for pinching engagement of the wall of the shield between the lip 126 and the first side wall 104. The lip 126 is normally spaced from the first side wall 104 a distance which is less than the thickness of the wall of the shield. As the wall of the shield is inserted in the slot 114, the wall engages the lip 126 of the shield clip 112. The shield clip 112 is displaced and flexes away from the first side wall 104 along the line where the shield clip 112 joins the flange 110. As the shield clip 112 is displaced, the wall of the shield is free to slide into the slot 114. When the wall is positioned in the slot 114, the wall is pinchingly engaged by the shield clip 112 between the lip 126 and the first side wall 104.

For subsequent removal, the wall of the shield slides out of the slot 114 by applying a suitable withdrawal force. Thus the shield is removable without being damaged so that components located within the shield may be tested or repaired. The shield may be replaced subsequent to such repair by reinserting the wall of the shield into the slot 114

The clip 100 including the shield clip 112 is shaped to ease the insertion of the wall of the shield into the slot 114. A distal portion 128 of the shield clip 112 is further angled away from the first side wall 104 at the lip 126 to define a widened opening 130 between the distal portion 128 and the first side wall 104 for easy insertion of the wall of the shield into the slot 114. The distal portion 128 guides the wall of the shield into the slot 114 as the wall is inserted into the slot 114. This reduces the tolerance for manual or automatic placement of the shield and reduces defects caused by misplaced shields, thereby reducing manufacturing costs of products using the clip 100. To further guide the wall of the shield into the slot 114, in the illustrated embodiment, an outer surface 132 of the first side wall 104 is angled away from the distal portion 128 of the shield clip 112 to define the widened opening 130.

In the illustrated embodiment, the clip 100 including the retainer 102, the flange 110 and the shield clip 112 are formed from a single piece. This reduces the overall cost of the clip 100, as the clip 100 may be readily formed from a metal conductor or other suitable material. Also, integration of the retainer 102, flange 110 and shield clip 112 improves the mechanical strength of the clip 100.

Figure 2:
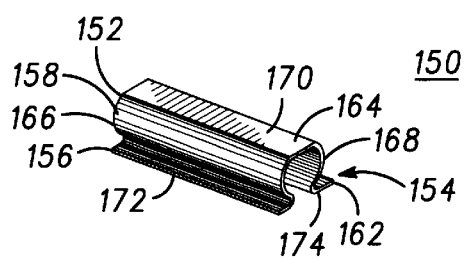
FIG. 2 is an isometric view of a second embodiment of a clip in accordance with the present invention.

Referring now to FIG. 2, it shows a second embodiment of a clip 150 in accordance with the present invention. The clip 150 for securing a cable to a surface of a printed wiring board includes a retainer 152 which defines a channel 154 sized to retain the cable and a flange 156 extending from the retainer for mounting to the surface of the printed wiring board.

The retainer 152 includes a first side wall 158 and a second side wall 160. The first side wall 158 is formed to define the flange 156. In the illustrated embodiment, the second side wall 160 is formed to define a second flange 162 for mounting to the surface of the printed wiring board. However, it will be recognized that one of the flange 156 and the second flange 162 may be omitted, for example in applications where available surface area on the printed wiring board is limited.

The retainer 152 further includes a body 164, a first arm 166 and a second arm 168. The body 164 has a substantially flat outer surface 170. The outer surface 170 is suitable for engagement by a pick and place tool. The first arm 166 extends from the body 164. A distal end 172 of the first arm 166 defines the flange 156 for mounting the clip 150 to the surface of the printed wiring board. The second arm 168 similarly extends from the body 164, and the distal end 174 of the second arm 168 defines the second flange 162 for mounting to the surface of the printed wiring board. The first arm 166 and the second arm 168 define the channel 154. In the illustrated embodiment, the distal end 172 of the first arm 166 and the distal end 174 of the second arm 168 are spaced a distance less than a diameter of the cable for snap-fit retention of the cable in the channel 154. In alternative embodiments of the clip 150, the first arm 166 and the second arm 168 are U-shaped or V-shaped or any other convenient shape to retain the cable.

Figure 4:
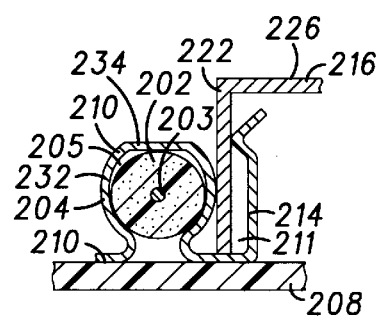
FIG. 4 is a cross sectional view taken along line 4—4' in FIG. 3.
Figure 3:
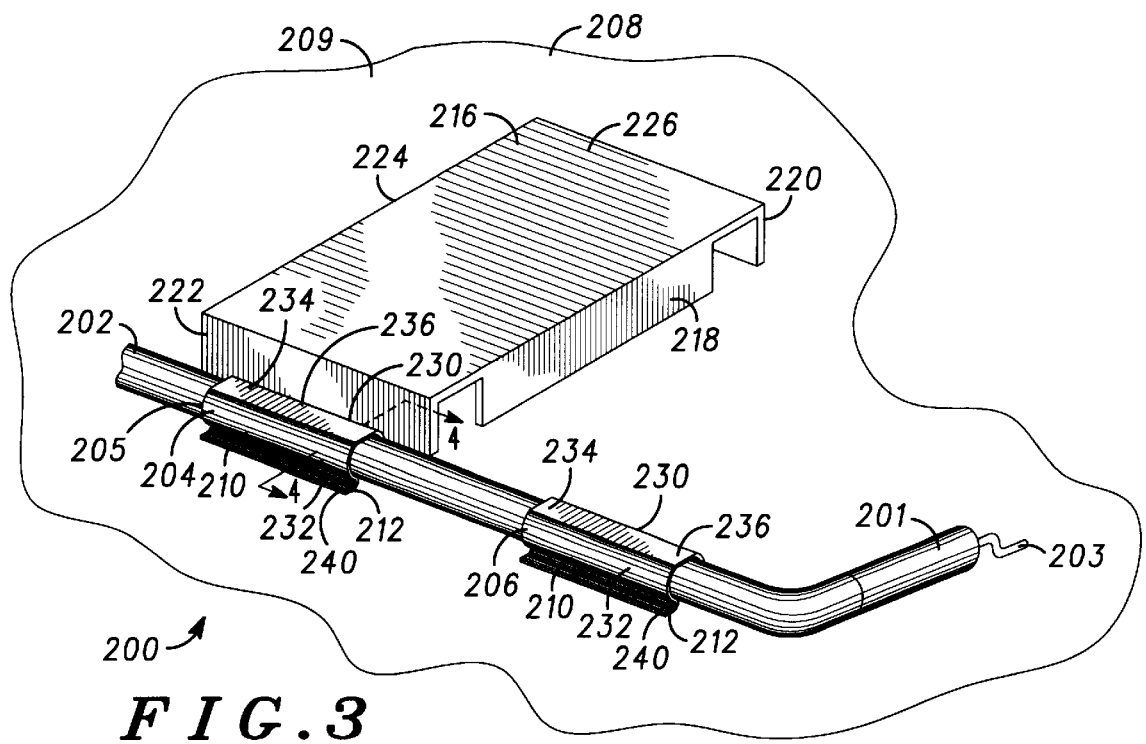
FIG. 3 is an isometric view of a cable assembly in accordance with the present invention.

Referring now to FIG. 3, and FIG. 4, they show a cable assembly 200 in accordance with the present invention. FIG. 3 is an isometric view of the cable assembly 200 and FIG. 4 is a cross sectional view taken along line 4—4' in FIG. 3. In FIGS. 3 and 4 a cable assembly 200 includes a cable 202 and one or more clips including clip 204 and clip 206 for securing the cable 202 to a surface of a printed wiring board 208. The cable 202 includes a jacket 201 surrounding a center conductor 203. Clip 204 is configured like clip 100 in FIG. 1. Clip 206 is configured like clip 150 in FIG. 2. The clip 204 and the clip 206 each includes a retainer 210 having side walls defining a channel 205 sized for snap-fit retention of the cable 202 and a flange 212 for mounting to the printed wiring board 208. The clip 204 further includes a shield clip 214 extending from the retainer 210 to retain a wall of a shield between the retainer 210 and the shield clip 214. In FIG. 3, the clip assembly further comprises a shield 216 having a plurality of side walls including wall 218, wall 220, wall 222 and wall 224 and a top surface 226. One of the side walls, wall 222 is inserted in the channel 211 of the clip 204.

The retainer 210 includes a first side wall 230 and a second side wall 232 joined by a base 234 to define the channel 205. In the illustrated embodiment, the channel 205 is open on one side. The base 234 of the retainer 210 has a substantially flat outer surface 236 suitable for engagement by a pick and place tool such a vacuum tool. Similarly, the top surface 226 of the shield is illustrated as being suitable for engagement by a pick and place tool. In this manner, the cable assembly including the shield 216 may be automatically mounted on the surface 209 of the printed wiring board 208.

The first side wall 230 of the retainer 210 of clip 204 and clip 206 includes a flange disposed on a side opposite the base 234 for mounting on the surface 209 of the printed wiring board 208. The flange on the first side wall is not visible in FIG. 3 but is preferably similar to the flange 110 of the clip 100 embodied in FIG. 1 or flange 156 of the clip embodied in FIG. 2. The flange is preferably suitable for soldering to the surface 209. In the illustrated embodiment, the first side wall 230 is formed to define a first flange (not visible in FIG. 3) and the second side wall 232 is formed to define a second flange 240 for mounting on the surface 209 of the printed wiring board 208. As noted above in connection with FIG. 1, the first flange and the second flange 240 may be sized and configured as necessary to securely retain the cable 202 and the shield 216 while not interfering with other surface mount components or other features of the printed wiring board 208.

As can be seen from the foregoing, the present invention provides a surface mount cable clip and shield clip which permits handling and mounting of cable assemblies by automated pick and place procedures, such as by a vacuum tool. The cable may be located and placed by attaching the vacuum tool to the flat surface of the clip. The clip includes a flange for surface mounting such as soldering. The flange prevents the cable from rolling on the surface of the printed wiring board as the cable is mounted to the surface. The shield clip allows a shield to be removably attached to the surface of the printed wiring board using the clip. The clip and cable assembly in accordance with the present invention reduce costs of manufacturing of equipment in which they are used by permitting automated operation and fewer damaged assemblies.

While a particular embodiment of the present invention has been shown and described, modifications may be made. It is therefore intended in the appended claims to cover all such changes and modifications which fall within the true spirit and scope of the invention.

What is claimed is:

1. A clip for securing a cable and a shield to a surface of a printed wiring board, the clip comprising:
    a retainer having a first side wall and a second side wall which define a channel sized to retain the cable, the first side wall having a flange for mounting to the surface of the printed wiring board, the second side wall including a second flange for mounting to the surface of the printed wiring board; and
    a shield clip extending from the flange, the shield clip spaced from the first side wall to retain a wall of the shield between the first side wall and the shield clip.

2. A clip for securing a cable and a shield to a surface of a printed wiring board, the clip comprising:
    a retainer having a first side wall and a second side wall which define a channel sized to retain the cable, the first side wall having a flange for mounting to the surface of the printed wiring board; and
    a shield clip extending from the flange, the shield clip spaced from the first side wall to retain a wall of the shield between the first side wall and the shield clip, the shield clip extending from the flange to define a slot between the first side wall, the flange and the shield clip, the slot sized to receive the wall of the shield, a distal portion of the shield clip angled toward the first side wall to define a lip for pinching engagement of the wall of the shield between the lip and the first side wall.

3. A clip as recited in claim 2 wherein the distal portion of the shield clip further angles away from the first side wall at the lip to define a widened opening between the distal portion and the first side wall for easy insertion of the wall of the shield into the slot.

4. A clip as recited in claim 3 wherein an outer surface of the first side wall is angled away from the distal portion of the shield clip to define the widened opening.

5. A clip as recited in claim 4 further comprising a base joining the first side wall and the second side wall, the base having a substantially flat outer surface for engagement by a pick and place tool.

6. A cable assembly comprising:
    a cable;
    a clip for securing the cable to a surface of a printed wiring board, the clip including
        a retainer having side walls defining a channel sized for snap-fit retention of the cable and a flange for mounting to the surface of the printed wiring board; and a shield clip extending from the retainer, the shield clip spaced from the retainer to retain a wall of a shield between the retainer and the shield clip; and said shield having a plurality of side walls and a top surface, one side wall being inserted in the channel of the clip.

7. A cable assembly comprising:

a cable;

a clip for securing the cable to a surface of a printed wiring board, the clip including a retainer having side walls defining a channel sized for snap-fit retention of the cable and a flange for mounting to the surface of the printed wiring board, the retainer comprising a first side wall and a second side wall joined by a base to define the channel, the channel being open on one side to receive the cable, the base of the retainer having a substantially flat outer surface for engagement by a pick and place tool, the first side wall formed to define a first flange and the second side wall formed to define a second flange for mounting on the surface of the printed wiring board; and a shield clip extending from the retainer, the shield clip spaced from the retainer to retain a wall of a shield between the retainer and the shield clip.

* * * * *

UNITED STATES PATENT AND TRADEMARK OFFICE
CERTIFICATE OF CORRECTION

PATENT NO. : 5,949,020
DATED : September 7, 1999
INVENTOR(S) : Mitchell et al.

It is certified that error appears in the above-indentified patent and that said Letters Patent is hereby corrected as shown below:

Title Page

Under "Attorney, Agent or Firm", please insert the name of
--John G. Rauch-- after "Mark D. Patrick".

Signed and Sealed this

Twenty-second Day of February, 2000

Attest:

Q. TODD DICKINSON

*Attesting Officer*    *Commissioner of Patents and Trademarks*